USO10095601B2

(12) United States Patent
De Oliveira et al.

(10) Patent No.: US 10,095,601 B2
(45) Date of Patent: Oct. 9, 2018

(54) TRIPLE SOFTWARE REDUNDANCY FAULT TOLERANT FRAMEWORK ARCHITECTURE

(71) Applicant: THALES, Courbevoie (FR)

(72) Inventors: Jaime De Oliveira, Palaiseau (FR); Guy Estaves, Toulouse (FR); Fabian Tourteau, Toulouse (FR); Christoph Scherrer, Vienna (AT)

(73) Assignee: THALES, Courbevoie (FR)

( * ) Notice: Subject to any disclaimer, the term of this patent is extended or adjusted under 35 U.S.C. 154(b) by 172 days.

(21) Appl. No.: 15/103,806

(22) PCT Filed: Dec. 8, 2014

(86) PCT No.: PCT/EP2014/076820
§ 371 (c)(1),
(2) Date: Jun. 10, 2016

(87) PCT Pub. No.: WO2015/086488
PCT Pub. Date: Jun. 18, 2015

(65) Prior Publication Data
US 2016/0314057 A1    Oct. 27, 2016

(30) Foreign Application Priority Data
Dec. 13, 2013  (EP) .................................... 13290313

(51) Int. Cl.
*G06F 11/00*   (2006.01)
*G06F 11/36*   (2006.01)
(Continued)

(52) U.S. Cl.
CPC ...... *G06F 11/3612* (2013.01); *G06F 11/1484* (2013.01); *G06F 11/182* (2013.01);
(Continued)

(58) Field of Classification Search
CPC ............. G06F 11/2023; G06F 11/0712; G06F 11/0757; G06F 11/1662; G06F 9/45533; H06L 63/0272
See application file for complete search history.

(56) References Cited

U.S. PATENT DOCUMENTS 6,625,751 B1 *   9/2003   Starovic .............. G06F 11/1484
                                                      714/11
2008/0148015 A1   6/2008   Takamoto et al.
(Continued)

FOREIGN PATENT DOCUMENTS

EP    0 977 395 A1    2/2000
EP    2 498 184 A1    9/2012
(Continued)

OTHER PUBLICATIONS

Baumann, "The Multikernel: A new OS architecture for scalable multicore systems", Aug. 10, 2009, Systems Group, ETH Zurich, p. 1-20.*
(Continued)

*Primary Examiner* — Bryce P Bonzo
*Assistant Examiner* — Jeison C Arcos
(74) *Attorney, Agent, or Firm* — Baker & Hostetler LLP

(57) ABSTRACT

A computer implemented method of detecting a fault in a system comprises the steps of executing at least three virtual machines, each virtual machine executing a same application software, in separated and isolated memory segments and in a dedicated core of a multi-core processor; the virtual machines being synchronized and concurrently executed by a common hypervisor; wherein non-faulty virtual machines provide an identical output message within a predefined time-interval; detecting a fault in an output of a virtual machine, the fault corresponding to a different output message of the faulty virtual machine. Developments include a distributed vote mechanism, pull/push mechanisms, asso-
(Continued)

ciation of output vote messages with a safety extension comprising identification information, virtual machine recovery using data context.

15 Claims, 4 Drawing Sheets

(51) Int. Cl.
| | | |
|---|---|---|
| *G06F 11/14* | (2006.01) | |
| *G06F 11/18* | (2006.01) | |
| *G06F 11/16* | (2006.01) | |
| *G06F 11/07* | (2006.01) | |
| *G06F 9/455* | (2018.01) | |

(52) U.S. Cl.
CPC ...... *G06F 11/3664* (2013.01); *G06F 11/3672* (2013.01); *G06F 9/45533* (2013.01); *G06F 11/0712* (2013.01); *G06F 11/0757* (2013.01); *G06F 11/1658* (2013.01); *G06F 11/187* (2013.01); *G06F 2201/805* (2013.01); *G06F 2201/865* (2013.01)

(56) References Cited

U.S. PATENT DOCUMENTS

2011/0208997 A1* 8/2011 Czajkowski ........ G06F 11/1497
714/10
2011/0296201 A1* 12/2011 Monclus ................. G06F 21/53
713/190
2013/0205295 A1* 8/2013 Ebcioglu ............ G06F 9/45533
718/1
2016/0202927 A1* 7/2016 Klarakis ............... G06F 3/0619
709/217
2017/0060431 A1* 3/2017 Kochunni ............. G06F 3/0605

FOREIGN PATENT DOCUMENTS

EP       2884392 A1 *  6/2015  .......... G06F 11/1484
FR     2 972 548 A1     9/2012

OTHER PUBLICATIONS

R. Paharsingh et al., "An Availability Model of a Virtual TMR System with Applications in Cloud/Cluster Computing," 2011 IEEE 13th International Symposium on High-Assurance Systems Engineering, Nov. 10, 2011, pp. 261-268, XP032083396.

C. M. Jeffery et al., "A Flexible Approach to Improving System Reliability with Virtual Lockstep," IEEE Transactions on Dependable and Secure Computing, vol. 9, No. 1, Sep. 30, 2010, pp. 2-15, XP011398056.

C. M. Jeffery et al., "Towards Byzantine Fault Tolerance in Many-Core Computing Platforms," 13th IEEE International Symposium on Pacific Rim Dependable Computing, Dec. 17, 2007, pp. 256-259, XP031234599.

* cited by examiner

TRIPLE SOFTWARE REDUNDANCY FAULT TOLERANT FRAMEWORK ARCHITECTURE

CROSS-REFERENCE TO RELATED APPLICATIONS

This application is a National Stage of International patent application PCT/EP2014/076820, filed on Dec. 8, 2014, which claims priority to foreign European patent application No. EP 13290313.9, filed on Dec. 13, 2013, the disclosures of which are incorporated by reference in their entirety.

TECHNICAL FIELD

This patent relates to the field of digital data processing and more particularly to the field of fault tolerance systems.

BACKGROUND ART

Operating a processor in space, for example in a satellite, is crucial for mission accomplishment and for data integrity. Environmental constraints lead to try to improve the control of systems' tolerance to faults.

Currently, the radiation sensitivity technical problem is mitigated with solutions based on Triple Modular Redundancy (TMR) architectures or/and specific "rad-hard" (i.e. radiations hardened) digital integrated circuits. TMR architectures are well known fault tolerant techniques applicable to digital integrated circuits design up to system level architecture which consist in replicating three times a physical computing block performing the same task and to vote their outputs. A rad-hard digital integrated circuit is a (manufacturing level) approach which consists in using particular process technologies (e.g. Silicon-on-Insulator—SOD or/and circuit design patterns to improve the processor fault tolerance. Both approaches provide proven radiation fault tolerance effectiveness but they present several disadvantages.

These approaches are extremely expensive (for example in terms of acquisition costs and downstream engineering costs). They are based on old technologies offering very low processing power and do not take profit of commercial high performance technologies. They are also often mission dependant, i.e. not designed for scalability and therefore not reusable.

The published patent document EP2498184 discloses a device which has a software layer i.e. hypervisor (202), centralizing exchanges between a processor and an application (201) and implementing management mechanisms of fault tolerances. A programmable electronic component forms an interface between the processor and a memory unit e.g. synchronous dynamic RAM and a data input and output interface. One of the mechanisms is a reset function at known state of the processor, where the function is periodical with a configurable period. The mechanism is reset to the known state by a resetting signal issued by the programmable electronic component. This approach presents limitations.

Thus, there is the need of solutions to solve the aforementioned problems. Embodiments of the present invention offer such solutions, at least in part.

SUMMARY OF THE INVENTION

There is disclosed a computer implemented method of detecting a fault in a system comprising the steps of executing at least three virtual machines, each virtual machine executing a same application software, in separated and isolated memory segments and in a dedicated core of a multi-core processor; said virtual machines being synchronized and concurrently executed by a common hypervisor; wherein non-faulty virtual machines provide an identical output message within a predefined time-interval; detecting a fault in an output of a virtual machine, said fault corresponding to a different output message of said faulty virtual machine. Developments include a distributed vote mechanism, pull/push mechanisms, association of output vote messages with a safety extension comprising identification information, virtual machine recovery using data context.

Provided examples thus disclose a software framework architecture relying on embedded virtualization technologies allowing a combined fault tolerant SW/HW architecture based on COTS multi-core processors. Advantages associated with embodiments of the invention are numerous.

Cheaper and faster commercial processors (off-the-shelf—COTS) can be used. For example, satellite on-board payload applications can use modern processors, instead of traditional "rad-hard" digital integrated circuits. In particular, multi-core processors can be used (such processors are not manufactured for such radiation conditions existing in Space domain). Some embodiments thus enable high-bandwidth data processing and algorithm intensive computation. The tolerance of these multi-core processors to radiation-induced faults in Space domain is improved.

At the same time, the payload Application Software (application software (ASW)) tolerance to radiation-induced faults (i.e. preserving tolerance to radiation-induced faults) is preserved. In general, the integrity of output data is guaranteed. COTS-based computing platform according to embodiments of the invention achieve comparable levels of availability (and dependability) as with redundant rad-hard hardware solutions.

On-board satellites engineering is reduced, as well as purchase or acquisition costs while preserving application payload fault tolerance effectiveness to radiation-induced faults.

Embodiments of the invention in general provide flexible, scalable and reusable systems in Space domain critical missions. The described mixed SW/HW architecture is mission independent, i.e. generic and therefore reusable. The "Size, Weight and Power" (SWaP) trade-off is optimized. The performance/power consumption ratio and reduction of hardware on-board size and weight is improved. Computing boards can comprise less (and better) chips which participates to reduce satellites size and weight.

According to a first embodiment of the present invention, there is provided a method as further described in the appended independent claim 1.

A "virtual machine" is also called a "replica". In one aspect of the invention the triplication mechanism is introduced and is specifically implemented by way of virtualization. Instead of having a standard triplication where real hardware circuits are tripled, the triplication according to embodiments of the invention is virtualized in a special manner. As disclosed, the three virtual machines are executed in one multicore processor, using different cores of it (i.e. different subparts of the processor circuit). Each of the virtual machine a) executes a same application software b) executes in separated and isolated memory segments and c) executes in a dedicated core of a multi-core processor. In particular, it is noticeable that the three virtual machines are executed in parallel. Virtual machines are independent machines. The term "concurrently" can mean "simultaneously" in some embodiments, underlining the temporal aspect of the co-execution of virtual machines. Since the execution of an application in a virtual machine is deterministic, one can expect to get the same outputs from the three virtual machines and substantially the same execution durations for the three replicas resulting from the same inputs. Some lags can occur, due to the very complex underlying execution of operations at CPU level for example and, due to the competition regarding shared resources accesses at memory level for example. For example, CPU branch predictions or events may in the end slightly differ and a cascade of events may lead to a certain lag in time. Associated thresholds (e.g. dlmax) are introduced hereinafter. The deterministic criterion is enforced with worst case execution time estimations allowing the definition of maximum duration boundaries. According to these examples, ranges (or time windows) are defined (e.g. wdtime=dlmax−dlmin) for different portions of an application to compute the same maximum execution duration for the three replicas. Another way to express this notion of replica determinism is that each virtual machine has to react on the same input stream, in the same way, producing the same output stream within the same time frame (at least substantially for all of these criteria).

The parallel execution of the three virtual machines is to be underlined. Systems known in the prior art, for example granted patent FR2972548 used sequential execution of one or more programs. It is to be underlined that the introduction of a virtualization mechanism according to embodiments of the present invention is not straightforward per se, for example starting from this document FR2972548. Said document disclosed three hardware circuits, instead of three software instances according to some embodiments of the present invention. A fortiori, the further combination of a triplication mechanism with such a virtualization mechanism is a challenge. Among many aspects, the triplication mechanism is mostly known and mastered by space engineers, while it is largely ignored for standard (non spatial) information technology practitioners. The latter experts are more focused on implementing "standard" virtualization techniques. Embodiments of the invention disclose a specific virtualization (building on top of "standard" virtualization techniques). Such a specific virtualization, in particular for synchronization purposes, raises specific technical problems. Specific mechanisms have been therefore introduced (e.g. synchronization)

The three virtual machines do share a common hypervisor which can be assessed as the common denominator between the different subsystems according to the invention. A hypervisor is a software program, i.e. executable instructions by a computer. Replicas are associated with a "behaviour", i.e. deterministic results or outputs.

In one embodiment, the hypervisor can be a type I (1, one) hypervisor. This type of hypervisor generally corresponds to a software program running directly on top of the hardware layer, and is usually called "bare metal" hypervisor. It is generally a thin source code layer with a small memory footprint and runtime overhead. The advantage of this embodiment is that the small amount of code involved can render the overall solution less prone to errors. In another embodiment, the hypervisor can be a type II (2, two) hypervisor. This type of hypervisor corresponds to a software program relying on an Operating System (OS), and is usually called Type II hypervisor. Such hypervisors generally provide richer features, are generally less hardware specific but they also generally lead to longer execution time. The amount of software code involved is usually more important (but for example lightweight operating system distributions supporting virtualization are available and can blur the difference). In view of objective and foreseeable evolutions of the architecture of hardware processors, a hypervisor can be embodied as a firmware or digital integrated circuit, which can be more efficient (e.g. faster) than its software equivalents.

A fault can be an error message in the message stream. A faulty behaviour can be associated with or result in a SEFI event (interrupt) or another abnormality. Upon fault detection, some diagnosis and reaction operations can occur. A fault can be assessed at the expected duration to produce an output by a virtual machine.

The virtual machine having produced a fault is qualified as "faulty" virtual machine. The fault is assessed by comparisons of output results of the (deterministic) virtual machines.

The application software (ASW) is replicated on a computing element (CE)—this expression encapsulating both processor core and memory segment—each of these circuits subparts running a replica or virtual machine, each executing on a dedicated processor core, and executing in isolated memory segments with defined Inter-Partition Communication (IPC) links. These replicas process the same data input context in a bounded time and produce the output messages (data values) to a Communication and Synchronization (CS) software layer of the framework. This layer interfaces the (space) application software (ASW) payload and synchronizes all replicas and their data output values or output messages (e.g. sequence numbering, global time stamping), structures them (e.g. header, payload, checksum, trailer fields) following a communication protocol and appends a specific (a.k.a. according to the replica number it resides on) safety extension to the trailer field in order to obtain a reliable message.

In a development, the method further comprises the step of executing a distributed vote on output messages of the virtual machines to determine a voted output message.

At the highest level of abstraction, the method comprises a step of distributed vote. Such a method (and its variants) is independently known in the art, but its combination with embodiments of the invention is not. In one aspect, the application software (ASW) output data results are first not transmitted outside all virtual machines (associated computing platform (CP)). But they are broadcasted to all computing elements (CEs means Replicas) within the computing platform CP. For a system external to the CP, the CEs or replicas act like one entity, i.e. are not "visible", i.e. the CP is the only global system to interact with. CEs/replicas are internal components. Each partition has a local unique message with those data ready to be sent to neighbouring replicas for vote. The communication and synchronization (CS) software layer of each replica deals with all inter-partitions' point-to-point message transmissions (e.g. redundancy of connections, time control and protocols) relying on a local communication stack.

In a development, each virtual machine pulls or pushes an output message to the other virtual machines.

In this specific development, each partition starts exchanges in a sender state to push its local message to all partitions (a.k.a. including the replica itself) through each specific IPC link. Then to continue exchanges, each partition changes to receiver state to pull all messages received from all partitions through their links. In other words, the application software (ASW) output data results are still inside the computing platform. Each partition has the three instances of those data embodies in three messages recorded in a deposit-box ready for vote.

The voting software layer of the framework is distributed around all partitions. In other words, each partition embeds an instance of the voter which is able to find an agreement and to commit data alone. The vote essentially consists of comparison functions; one for the data specified part of the whole message (e.g. a byte-wise compare) and another that analyses integrity of partial safety extension code. Finally, a voting function builds a voted message with the full safety extension if at least two messages have been identified correct.

In a further development, the output messages of each virtual machine are collected in a deposit box and a voted output message is determined out of the output messages. The distributed vote is made in two sub-steps. In one development, the distributed vote is performed after a prior step of collecting each replica's voting messages in a deposit box before starting the voting method. In other words, each voter is also triplicated. Since now, all replicas' messages are set at disposal of each partition in their deposit box and so all replicated instances of voter can perform a vote on their own. This means that three votes are performed in parallel on different cores, using the same redundant messages but located in different memory regions.

In a development, the method further comprises the step of communicating the voted output message to an external system in communication with the system.

As discussed, for an external system in interaction with the hardware circuit unit or CP, the replicas act like one entity.

In a development, each virtual machine is predefined as primary or as secondary, and wherein the voted output message is communicated by the primary virtual machine or by the secondary virtual machine if the primary virtual machine is faulty.

At this point in time, each partition has a voted message with application software (ASW) output data messages or results ready to be sent outside the computing platform. In order to decide which partition will send it, by configuration, a partition is defined as primary (a.k.a. master sender if fault free) and another as secondary (in case of faulty primary partition).

In a development, output messages of the virtual machines are numbered and/or time stamped and/or structured and/or annotated.

In this development, metadata ("data about the data") is added to the data. For example, data can correspond to the application payload and metadata can correspond to a safety extension (e.g. a code according to the replica number the application resides on). Regarding data, output messages can also be structured or restructured (e.g. with header, payload, checksum, trailer fields) for example by following a communication protocol.

Regarding metadata, data output values or output messages of the replicas or virtual machines can be numbered or ordered or time stamped (e.g. sequence numbering, global time stamping). Additionally, output messages can be annotated (metadata), i.e. a specific safety extension or annotation can be appended to the trailer field or associated with the output messages (a.k.a. according to the replica number it resides on). The technical effect (consequence) is that reliable output messages are obtained.

In a development, the method of the preceding claim further comprises the step of associating a safety extension with an output message of a virtual machine, said safety extension comprising identification information about the virtual machine outputting the output message.

In one particular embodiment, the method further comprises the step of appending or associating a safety extension as metadata. This safety extension for example can be the one disclosed in EP0977395 entitled "Method of secure monochannel transfer of data between nodes of a network, computer network and computer nodes". The safety attachment in one embodiment is an extension made by the sender of a message which allows the receiver to detect intentional or unintentional changes brought to the message during the message transfer. In one embodiment, one computation channel (for example the primary or secondary sender) must preferably not be able to calculate a valid message alone. For computation of a valid message, at least two partitions have to be involved to generate a valid message. For that, in one embodiment, with a dedicated construction method, a safety extension can be appended to messages.

In an embodiment, the safety extension presents a fixed configured length (four up to ten bytes) to be added to metadata associated with a message. A defined process can be used to prevent each voter to calculate a valid message on their own. Each application appends a corrupted safety appendix to the message by omitting a part of the safety code corresponding to its location. There can be appended a safety appendix without the n-th byte according to the replica number it resides on. All instances of voter can get the messages from all partitions (i.e. from the voter's partition itself and from neighbour partitions) with these partial safety signatures. The voters can assemble the full message by filling in the omitted parts of the single partitions. In order to construct the complete safety code, each voter can use two messages with different safety signatures (i.e. messages providing from different partitions). Whenever the voter has identified two messages according to user data and (partial) safety extension to be correct, it can build a voted message with the full safety extension. As a result, each partition has a valid (i.e. voted) message with the correct length.

In a development, the method further comprises the step of recovering the faulty virtual machine. The recovery can be handled in various ways.

In a development, the method further comprises a step of recovering the faulty virtual machine, which step comprises using the data context of a non-faulty virtual machine to replace the data context of the faulty virtual machine.

In this development, contextual data of the application is re-injected, for example to reboot a virtual machine. The data context or contextual data thus comprises data about the virtual machine itself (e.g. RAM allocation, IP addresses, etc) and also data about the application ASW (e.g. values of certain variables, states of GUI windows, state of events buffer, etc). As temporary buffers or memories or caches can be backed up, it is possible to some extent to recover a previous state (or "snapshot") in the recent past and to re-establish both the states of the virtual machine and of the application (at least to a prior point in time before the point of failure). Noticeably, such contextual data is finite, i.e. there are de definite (and not infinite) set of parameters to be restored to recover from the failure. Experiments and prototypes have shown that a couple of tens of parameters is manageable. In one embodiment, such data context can be qualified by "functional data context".

In a development, the step of recovering the faulty virtual machine is performed at a re-synchronization point in time.

The recovery strategy proposed herein can use an operational synchronization between the replicated processes running in parallel. The virtual machines execute in parallel and the synchronization can be handled at some—predefined or not—synchronization points. In one embodiment, the software executed in parallel within the virtual machines can be partitioned in synchronized slots. The partitioning in slots can provide the synchronization points where parts (i.e. message broadcast, vote, recovery) of algorithm are started.

In a development, the execution is sliced thanks an external hardware event that provides event-driven synchronization points.

An embodiment to partition execution periodically for instance is a timer that provides time-driven synchronization points. One of these synchronization points triggers, in the replicated processes running concurrently in each virtual machine, the slot for the recovery strategy execution.

It is underlined that time synchronization points are optional (they not required). They correspond to one particular embodiment. In some embodiments, "heartbeat" synchronization can be implemented (i.e. synchronization occurs at defined time intervals, and not necessarily regular). In yet other embodiments, the synchronization can be "event-driven" (i.e. particular events can trigger one or more synchronizations between virtual machines). In other words, a "clock" or a "timer" (and the like) are entirely optional and are absolutely not required.

In a development, a fault is associated with a failure chosen from the list comprising: crash failure, faulty value failure, byzantine failure, timer failure and combinations thereof. In one embodiment, a voter solely operates on message streams. It does vote upon redundant messages and tries to find an agreement (i.e. vote on these messages). All faulty behaviours of one given replica manifest through abnormalities in the message stream. A voter can detect these unusual messages and can report back to the fault manager layer. The voter diagnoses errors in the message flow based on detections during predefined time windows. The fault "crash failure" designates a replica which does not send messages anymore, links between two replicas or sending parts on a replica which are broken (no longer working), software/hardware failure which leads to sending illegal messages on one replica (the other replicas have to deal with these erroneous messages). Such failures manifest themselves in faults which can be permanent or transient faults. Permanent faults are faults which influence the transmission of messages permanently. Transient faults are faults which influence the transmission of messages within a given time and are measured in percentage.

There is disclosed a computer program comprising instructions for carrying out any one of the steps of the method when said computer program is executed on a suitable computer device. There is disclosed a computer readable medium having encoded thereon such a computer program. There is also disclosed a system comprising means adapted to carry out any one of the steps of the method.

DESCRIPTION OF THE DRAWINGS

Embodiments of the present invention will now be described by way of example with reference to the accompanying drawings in which like references denote similar elements, and in which.

DETAILED DESCRIPTION OF THE INVENTION

Figure 1:
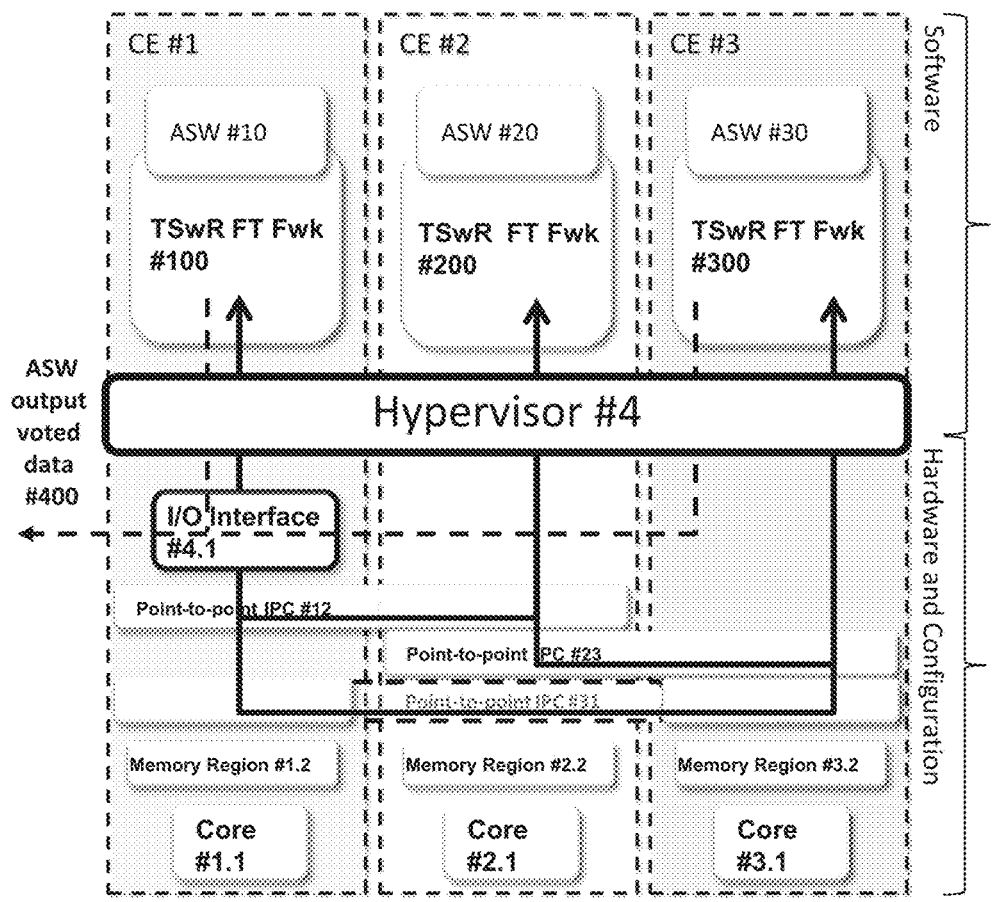
FIG. 1 illustrates a system view of an exemplary embodiment of the Triple Software Redundancy (TSwR) Fault Tolerant Framework (FT-Fwk) architecture.

The following acronyms are used: Commercial Off-The-Shelf (COTS); Single Event Upset (SEU); Single Event Functional Interrupts (SEFI); Triple Modular Redundancy (TMR); Application software (ASW); Computing Elements (CE); Computing Platform (CP); Triple Software Redundancy (TSwR); Fault Tolerant Framework architecture (FT-Fwk); Payload Data Unit (PDU).

An Single Event Upset (SEU) event corresponds to a change in a state of a bit (an elementary item of information) inside the processor caused by a particle, for example a heavy ion.

A Single Event Functional Interrupts (SEFI) event corresponds to a locking state of the processor. This event can be a direct consequence of a Single Event Upset (SEU) event which has brought about a change in behaviour of the processor.

A Computing Platform (CP) is a hardware machine which comprises installed on the COTS multi-core processor, memory units (e.g. RAM-based, EEPROM or PROM) and data input/output (I/O) interfaces (e.g. Ethernet, CAN, I2C buses).

Computing Elements (CE) are Virtual Machines (a.k.a. Partitions) with a set of virtual hardware resources such as one processing core, isolated memory segments and a subset of input/output interfaces based on the partitioning of computing platform (CP) hardware resources.

Provided examples disclose a system level approach with a combined SW (software)/HW (hardware) architecture to perform the computing platform radiation sensitivity mitigation.

Embodiments of the methods and systems disclose Triple Software Redundancy (TSwR) Fault Tolerant Framework (FT-Fwk) architecture to operate the satellite payload application software (ASW) on a modern COTS multi-core processor with virtualization technology and EDAC-protected memory (i.e. Error Correction Code—ECC mechanisms).

According to some embodiments, there is implemented a triple-software redundancy with virtual machines running in separated (and isolated) memory segments and simultaneously on top of a hypervisor software layer instead of a classical TMR solution. For higher availability (and therefore dependability), the triplicate application software (ASW) outputs are voted with a safety distributed voting method.

In a development, the "voter" is "distributed" (i.e. over the three virtual machines) in order to minimize software single point of failure. This voter or these voters operate on redundant messages (i.e. try to find an agreement) with the ability of instantaneous detection of errors that manifest in heavily used resources. Errors can be corresponding to faulty behaviours resulting from SEU (Single Event Upset) events which manifest in anomalies on the message stream (for example "message is missing" or "message content is wrong") are detected and masked.

According to another development, there is disclosed a synchronized "monitoring" of replicas which operates on replicas' deterministic behaviour; non-faulty replicas provide an identical output behaviour within a given time-interval (e.g. even increased such as the Worst-Case Execution Time—WCET). At this end, the invention makes mechanisms within framework and extension of application software (ASW) for replicas' determinism enforcement to cover potential non-determinism behaviour of modern processors' architecture. Therefore, only the faulty behaviours resulting from SEFI events that manifest in anomalies on the duration to produce messages (as examples: message synchronization timeout expiration or no more replica's response) are detected, isolated and will be recovered.

In some embodiments, methods and systems comprise a triple-software redundancy (a.k.a. logical instead of physical) of Computing Elements (CEs) within fault tolerant framework architecture executing a threefold space application software (ASW) payload on a Computing Platform (CP). The principle is to use Virtual Machines (VMs) as CEs over one commercial multi-core processor-based computing platform (CP) instead of several physical CEs to realize a triplication redundancy of application software (ASW).

In some embodiments, there are executed three synchronized replicas of a space application software (ASW) payload. Each execution is monitored for fault detection. Faulty replicas are recovered and votes replicas are outputted with a safety distributed majority voting method.

An Hypervisor software layer is used to predefine virtual machines to run from separated and isolated memory segments and to operate simultaneously on different processing cores. Both advantages reduce probabilities of application payload locking situation.

There is defined a distributed software framework to implement synchronization, communication and usual fault tolerant functionalities such as fault management (e.g. fault detection, diagnosis and reaction). This approach contributes to reduce locking situation probabilities by minimizing software single point of failure.

In a development, there is disclosed a method of distributed voting (a.k.a. three instances of "2-out-of-3" majority voter) which commits and finds an agreement between application software (ASW) output messages extended with safety protocol artefacts such as round number, global time stamp and unique safety extension code. This approach contributes to improve application payload availability and to minimize software single point of failure.

In a development, there is disclosed a recovery strategy (and associated steps) The recovery is a redundant data recovery type which uses the data context of a valid replica to replace the incorrect data context of the erroneous replica at a point in time (a.k.a. the recovery strategy uses an operational synchronization between the replicated processes running in parallel).

The invention operates on a computing platform which comprises a modern commercial multi-core processor, memory units and data input/output interfaces. Another aspect, on which the fault tolerant framework relies on, is a Hypervisor software layer to allow executing several VMs concurrently on this computing platform (CP).

The application software (ASW) is replicated on each computing element (CE) which each contains a dedicated processing core, isolated memory segments and defined Inter-Partition Communication (IPC) links. These replicas process the same data input context in a bounded time and produces the data output values to a Communication and Synchronization (CS) software layer of the framework. This layer interfaces the space application software (ASW) payload and synchronizes all replicas and their data output values (e.g. sequence numbering, global time stamping), structures them (e.g. header, payload, checksum, trailer fields) following a communication protocol and appends a specific (a.k.a. according to the replica number it resides on) safety extension to the trailer field in order to obtain a reliable message.

At this point in time, the application software (ASW) output data results are not transmitted outside the computing platform CP. Each partition has a local unique message with those data ready to be sent to neighbouring replicas for vote.

The CS software layer of each replica deals with all inter-partitions' point-to-point message transmissions (e.g. redundancy of connections, time control and protocols) relying on a local communication stack. Each partition starts exchanges in a sender state to push its local message to all partitions (a.k.a. including the replica itself) through each specific IPC link. Then to continue exchanges, each partition changes to receiver state to pull all messages received from all partitions through their links.

At this point in time, the application software (ASW) output data results are still inside the computing platform. Each partition has the three instances of those data embodies in three messages recorded in a deposit-box ready for vote.

The voting software layer of the framework is distributed around all partitions. In other words, each partition embeds an instance of the voter which is able to find an agreement and to commit data alone. The vote essentially consists of comparison functions; one for the data specified part of the whole message (e.g. a byte-wise compare) and another that analyses integrity of partial safety extension code. Finally, a voting function builds a voted message with the full safety extension if at least two messages have been identified correct.

At this point in time, each partition has a voted message with application software (ASW) output data results ready to be sent outside the computing platform. In order to decide which partition will send it, by configuration, a partition is defined as primary (a.k.a. master sender if fault free) and another as secondary (in case of faulty primary partition).

In some embodiments, commercially available modern multi-core processors can be used for space applications (for example, PowerPCs or DSPs Digital Signal Processors). In particular, SEU and SEFI effects can be managed by handling the following failures:

Crash failures: a SEU/SEFI leads to either a replica does not send any more messages; or both links between two replicas are broken or a sending replica is crashed/locked;

Faulty value failure: a SEU leads to sending illegal messages on one replica;

Byzantine failure: a replica sends a different message (but authenticated) to the neighbouring replicas in the same round;

Timer failure: a replica initiates a new synchronization point before the minimum round period has expired.

In case one of these failures occurs, a fault management software layer in charge of fault diagnosis and fault reaction based on fault detection information reported by different framework components can be used.

A recovery strategy can be used to reintegrate a faulty replica during operation without interruption of service: for example, the faulty replica can be reloaded and restarted, with input data context from a correct replica (while neighbouring replicas make no progress for example).

FIG. 1 illustrates a system view of an exemplary embodiment of the Triple Software Redundancy (TSwR) Fault Tolerant Framework (FT-Fwk) architecture, with a multi-core processor appropriately selected and wisely configured:

The computing platform (CP) hardware and its partitioned physical resources comprise a plurality of processing cores (for example #1.1, #2.1, and #3.1); a plurality of SDRAM-based (Synchronous Dynamic Random Access Memory) memory segments (for example #1.2, #2.2 and #3.2); and a plurality of shared memory channels (for example #12, #23, #31) and an I/O interface (for example #4.1).

The three-unit configuration is only an example. A computing platform can comprise a higher number of units (at least 2 and for example 186 units in replica configuration, or any other number, in correspondence with the number of cores of modern processors, whose roadmaps include 1000-cores processors or even more)

For example, in one other embodiment, the processing resource can be a quad-core processor (with one core disabled or forced to idle state) with hardware virtualization features (e.g. an additional privilege mode of execution at processor level), with one or two levels of cache memory including protection mechanisms (e.g. parity bits, an Error-Correcting Code—ECC) and with a Memory Management Unit (MMU) which segments the addressable memory space.

The Hypervisor (HV) software layer #4, appropriately chosen, creates and manages the CEs, allocates physical resources to them and guarantees this allocation and their access during runtime.

In one development, the Hypervisor #4 is a thin software layer with services to manage events at processor level and in particular interrupts, running at the highest privilege mode of execution and offering open interfaces (APIs) for ad-hoc extensions.

The computing elements #1, #2 and #3 are partitions, defined with dedicated set of virtual hardware resources based on the partitioning of actual hardware resources and running replicas #10, #20 and #30 of the application software (ASW) payload correctly interfaced to instances #100, #200 and #300 of the Triple Software Redundancy (TSwR) Fault Tolerant Framework (FT-Fwk). In the example, the CE #3 is configured as primary channel for outside transmissions and the CE #1 is configured as secondary channel in case of CE #3 has been detected faulty. The CE #2 does not necessary need outside transmission channel.

An exemplary embodiment of a space application software (ASW) payload is described hereinafter for replicas #10, #20 and #30. The principles behaviour and interface of this payload application, necessary for invention understanding, are presented:

the payload application is launched with a starting data input context and it executes forever computing rounds, updating each time the data input context, to produce corresponding data output values (for the outside). The time duration of a computing round is finite and can be bounded.

the data input comes from a memory segment (not shown) identified by a known base address and an address offset namely the context. Other data incoming variants may be envisioned such as periodical time-triggered data coming from an external input/output interface.

a computing round consists of processing the data input of entry context, to produce corresponding data output values to outside and to update the entry context for next computing round. In case of time-triggered data input, the context is replaced by synchronous time period.

the data output values which are the payload application results are transmitted by a channel communicating with the outside through the input/output interface. Several variants of this interface may be used such as Ethernet, I2C or SPI buses.

Figure 2:
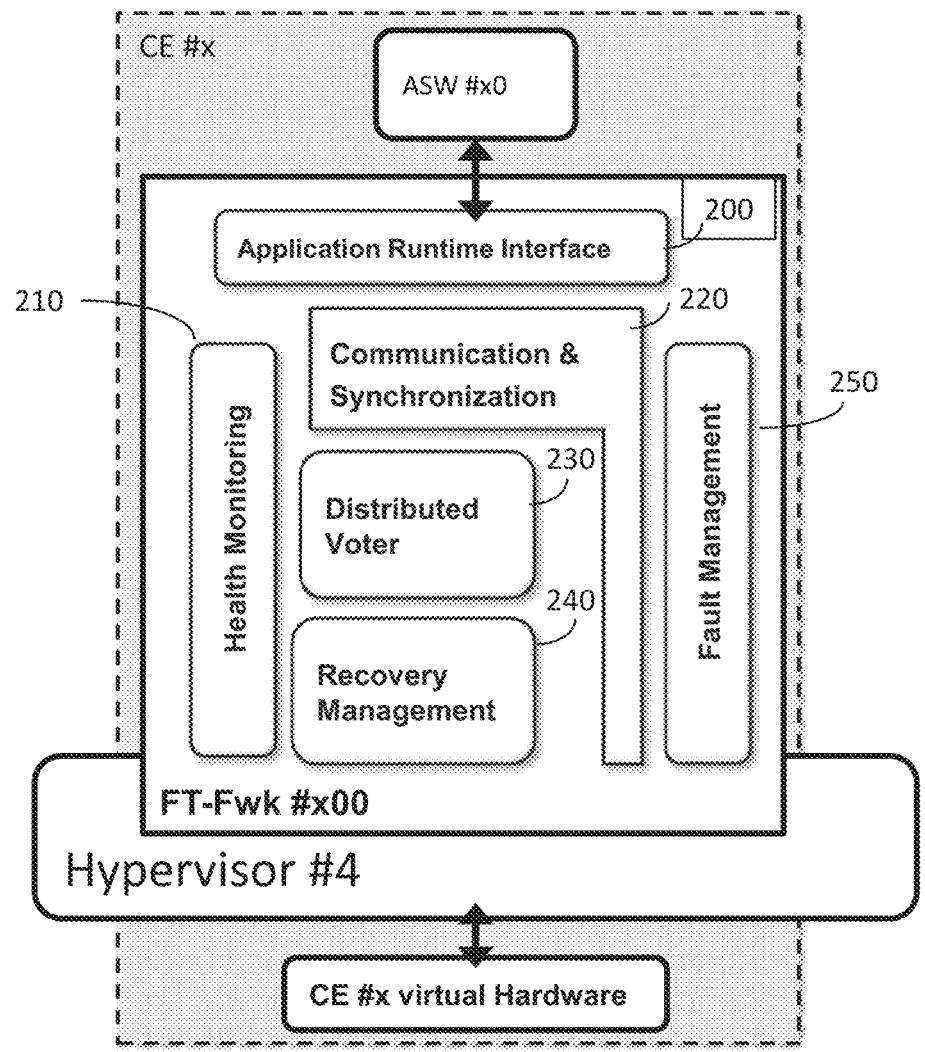
FIG. 2 details the system view of the software framework.

FIG. 2 details the system view of the software framework.

The figure comprises an Application Runtime Interface 200, a Health Monitoring component 210, a Communication and Synchronization component 220, a Distributed voter 230, a recovery management component 240 and a Fault management component 250.

An Application Runtime component 200 is an application component in charge of running the ASW in a replicate manner through well defined interfaces that minimize the ASW attachments to the TSwR framework and to manage the Virtual Channel (equivalent to OCS framework). As an example, it opens the Virtual Channel and establishes all underlying sub-channels connections. "Application" identifies a group of components of the TSwR framework interfacing with the domain ASW and running at the user level (in opposition to super-user and hypervisor).

A Health Monitoring component 210 is a component in charge of implementing appropriate runtime mechanisms to control the safety of system. As an example, it monitors execution of hypervisor and replicas (e.g. timeouts, watchdog).

A Communication & Synchronization component 220 is a core component in charge of various aspects such as the message queues services, the synchronicity of running ASW and the distribution of messages around all replicas. "Core" identifies a key layer of the TSwR framework to ensure deterministic behaviour and messages consistency.

A Distributed Voter component 230 is a component scattered around all replicas that is in charge of finding an agreement on redundant messages from replicated ASW. The software components of this block are closely coupled with synchronization layer and fault manager.

A Recovery Manager component 240 is a component in charge of reintegrating a faulty ASW replica during operation without interruption of service. As an example, it transfers the states and data information from a correct replica while application makes no progress.

A Fault Manager component 250 is a core component in charge of fault diagnosis and fault reaction based on fault detection information reported by different framework components. It is responsible for executing the appropriate reaction upon faults and to handle redundancy management. "Core" identifies a key component of the TSwR framework to achieve fault tolerance need.

The figure illustrates a functional outline of the software framework, comprising functional components, specific mechanisms and software building blocks. The figure shows a Computing Element CE #x (with its virtual Hardware), wherein x is a number of a CE, an application software (ASW) #x0 and a framework FT-Fwk #x00. This functional outline of invention can indeed apply to any Computing Element CE, application software (ASW) and FT-Fwk of the software architecture. The overlap of Hypervisor #4 and FT-Fwk #x00 illustrates that various variants for the software static breakdown architecture can be implemented.

An Application Runtime Interface 200 is a component which can be in charge of running the application software (ASW) payload in a replicate manner through defined software interfaces which minimize the application software (ASW) payload attachments to the TSwR FT-Fwk architecture. For this purpose, the component on the one hand provides an interface as entry point to launch the application software (ASW) with the synchronized (and correct) data input context, and on the other hand provides a synchronization point interface which shall be called by the application software (ASW) at the end of each computing round with the produced data output values. The latter interface formats the produced data output values and round context information in a Payload Data Unit (PDU) message to pass to the communication and synchronization layer.

A Health Monitoring component 210 is a functional component in charge of implementing appropriate run-time mechanisms to control software and processor operations. According to this fault tolerant feature, the chosen processor provides a watchdog mechanism for each core configured and managed at hypervisor privilege level. For fault detection purposes, the component monitors execution of hypervisor and of replicas (e.g. timeout expiration, watchdog). At this end, it provides an interface to ping, at a regular interval, the watchdog to notify it which all is operating correctly. In the absence of such ping call at the end of a predefined time period, the watchdog resets the core (or respectively the processor) executing the Computing Element CE #x (or respectively the Hypervisor #4) software. By this mechanism, a hardware and/or software lock state is detected and can be rectified. In some embodiments, this component can comprise means (and corresponding interfaces) for computing delays and triggering timeout expiration conditions (e.g. implementation of alarms or timers—start/stop/interrupt handler/flags). In another embodiment associated with such a health monitoring watchdog feature, there is used an additional external hardware watchdog mechanism for activating the processor reset. The hypervisor sends, at a regular interval, a signal to this external mechanism to notify it which it is operating correctly. In absence of such a signal at the end of a predefined time period, the external hardware watchdog resets the processor.

A Communication & Synchronization component 220 ("globalization module is a component which is mainly in charge of synchronization between application software (ASW) replicas (#10, #20 and #30), distribution of application software (ASW) replicas redundant data output values around all FT-Fwk instances (#100, #200 and #300). The computing platform (CP) is associated with a replicated configuration. Replicate instances of application software (ASW) are synchronized. In order to define states in which it is possible to correlate redundant output values with respect to message orders and data contents, the synchronization takes place when the application software (ASW) utilizes defined software interfaces, creating synchronous blocking points (also useful for a faulty replica reintegration). The fault detection is performed by comparison of the output behaviours which include the message sending behaviour of the application software (ASW) replicas (through the Application Runtime Interface 200). The central service of the synchronization layer module of FT-Fwk is the "globalization" of messages. This service defines which messages, available on one CE, are distributed. The service distributes messages in such a way that these messages are available in the same consistent manner on all CEs in the computing platform (CP). For that purpose, the strategy for invoking such globalization activity is to allow each replica entity to initiate a synchronization activity with the synchronous blocking point. All partner replicas can immediately respond to the started synchronization activity. In other words, the first replica starting the globalization sets a defined delay (e.g. as example using health monitoring services) and all remaining replicas have to respond to the started globalization activity before the timeout expiration. In the absence of response from a replica, the health monitoring detects it and this replica is marked "faulty" by the Fault Management. In some embodiments, this globalization module comprises means to build a computing platform (CP) "global time" for messages time stamping which is computed with fault-free (at this point in time) replicas local time. Several equivalent implementation variants are possible (for example by computing the average value or the median value). In some embodiments, this component comprises means to exchange safety-relevant data over different existing transmission media (e.g. shared memory, Ethernet, I/Os Interface . . . ). The communication layer module of each FT-Fwk has an individual communication stack with a protocol layer, a data integrity layer and a device layer. The protocol layer is responsible for the control and the monitoring of the message transfer procedure, while the data integrity layer provides the received messages examination and the messages' construction for emission including the unique safety extension code. The task of the device layer consists essentially to structure and to monitor the data exchange completion according to requirements of existing transmission media cases.

A Distributed Voter (231,232,233) is a component which is in charge of finding an agreement upon redundant messages from Computing Elements (CE#1, CE#2 and CE#3), determining and committing the correct message to outside computing platform (CP). Each voter is instantiated in each replica (within #100, #200 and #300), associates corresponding messages and puts this triplet in a deposit-box.

A voter (layer) module (231,232,233) is closely coupled with the fault management component 250 for error reporting reasons and with the communication and synchronization component 220 for getting the received messages in deposit-box and for transmitting outside the voted message as well.

A Recovery Manager component 240 is a component which is in charge of reintegrating a faulty replica during operation without interruption of service. As an example, it reloads and restarts a faulty replica providing the input data context (a.k.a. a functional execution context) from a correct replica while all application software (ASW) (ASW#1, ASW#2 and ASW#3) make no progress. This recovery feature intends to improve the availability of payload application. This recovery by redundancy takes its roots in systems which have redundancy properties. The principle characteristic carried on is the existence of several instances (duplication at minimum) processing the same inputs and running simultaneously. This is one of the invention aims.

This recovery strategy has to use the produced data of a valid instance to replace the incorrect data of the erroneous instance at a point in time. This replacement technique relies on an operational synchronization delivering a defined steady state between the replicas which run in parallel. This is one of the invention aims of the Communication and Synchronization component. It detects erroneous behaviour, reports this error to the Fault Management for a diagnosis and the suitable reaction.

At this end, the online reintegration operations are blocking (i.e. recovery is not done in the background to payload application activity): during this recovery time slot, the payload application makes no progress, in order to maintain the input data context coherency. According to one embodiment of invention, the recovery manager module is implemented within the Hypervisor #4 software layer. It runs in privilege execution mode, called at the end of processing round periods while replicas are waiting.

A Fault Management component 250 is a component which is in charge of fault diagnosis and fault reaction based on fault detection information reported by different framework components. It is responsible for executing the proper reaction upon faults and to handle redundancy management:

the membership status. To achieve a high level of SEU and SEFI fault tolerance, the invention aims to handle the following failures:

"Crash failures": a SEU/SEFI leads to either a replica does not send any more messages; or the link between two replicas is broken or a sending replica is crashed/locked;

"Faulty value failure": a SEU leads to sending illegal messages on one replica;

"Byzantine failure": a replica sends a different message (but authenticated) to the neighbouring replicas in the same round;

"Timer failure": a replica initiates a new synchronization point before the minimum round period has expired.

The detection of these states is scattered around all TSwR FT-Fwk functional components which are responsible for fault reporting through a well defined fault management interface. The invention aims to improve the payload application availability executed on a COTS modern processor and for which purpose, the fault management manages the hereinafter kind of faults status and respective actions:

"Warning": the CE #x detects a fault issued by a neighbourhood such as a missing message while timeout expires. According to one embodiment of invention, this leads to a status information with no reaction for CE #x.

"Severe Error": the CE #x generates a fault which it detects such as a core watchdog expiration. According to one embodiment of invention, this leads to redundancy management with an action for isolating this faulty replica and a request for future reintegration.

"Fatal Error": this fault corresponds to a non-recoverable SEU or SEFI which leads to a reset of entire computing platform (CP). An example is a software/hardware blocking state triggering the processor watchdog or voters did not find majority vote.

Along with the voter, the communication and the synchronization supervision activities a membership status of CEs (#1, #2 and #3) is managed. In case of a CE fails the synchronization protocol (e.g. a timeout expires) or a CE's message behaviour is detected faulty (e.g. message content error), an error is reported to Fault Management. This software layer diagnosis the status and the erroneous CE becomes a non-member for distributed voters and it is isolated. A non-member CE needs to be recovered before becoming member again.

Figure 3:
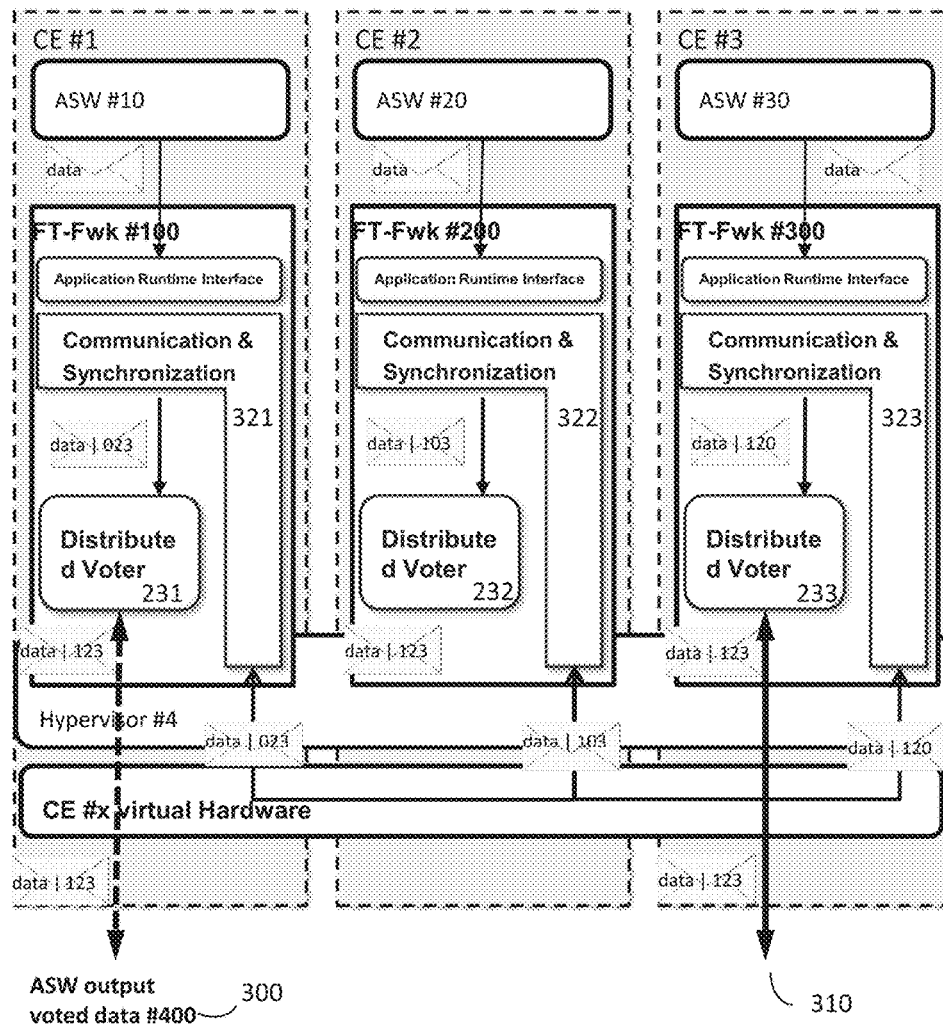
FIG. 3 illustrates an example of a communication and synchronization sequence.

FIG. 3 illustrates an example of a communication and synchronization sequence.

1. The replicate application software (ASW) enters to synchronous blocking point passing the current round Payload Data Unit (PDU);
2. The synchronization layer module synchronizes this Payload Data Unit (PDU) with a global timestamp;
3. Then a communication layer module (321, 322, 323) formats it (e.g. header, payload, checksum, trailer fields) and appends its own replica safety extension code (a.k.a. partial code according to the replica number it resides on) to the trailer field;
4. The message with this safety extension code is dispatched according to protocol procedure by the transmission media to others Computing Elements (CEs) and by record in deposit-box of local voter (231, 232, 233);
5. Each Computing Element (CE) records in own voter deposit-box the transmitted messages (containing redundant PDUs but different safety extension codes) and launches the voting mechanism;
6. Each local voter layer module (231, 232, 233) compares the correctness of their messages (e.g. byte-wise data comparison and safety code examination) then in case of agreement, an outside channel voted message is built with a full extension safety code (step 300);
7. The CE #3 configured as primary and not marked as faulty (otherwise, it is the CE #1 configured as secondary), sends the voted message to outside channel through the selected I/O interface media (step 310).

The voting mechanism is now described.

In the example of FIG. 3, exchanges of safety-relevant Messages for "2oo3" Vote are illustrated. Each voter (231, 232, 233) is instantiated in each replica (within #100, #200 and #300). Each voter associates corresponding messages and puts this triplet in a deposit-box. The triplet messages in the deposit-box are voted with a voting mode used for voting messages with a safety extension, for example with a "One Channel Safe" (OCS) voting method. Faulty messages are detected and masked along with the voting activities and anomalies are reported to the Fault Management component 250. This voting method can be defined for 2-out-of-3 late commitment voting: two messages of the three messages need to be identical and the agreed result is committed either when all messages have been received or a predefined timeout expires. The comparison method and the diagnosis method (in case of comparison error) distinguish between data field and safety extension.

An exemplary corresponding method or strategy can be:

comparing messages without safety extension (e.g. bit-, byte- or word-wise logical AND). If at least two messages are not considered to be correct so far, a fatal error is reported;

comparing the safety extensions of the messages which are considered to be correct. If at least two messages together with their safety extensions are not correct, a fatal error is reported;

generating a voted message with the full safety extension. If a voted message can be built, the user data are taken from a message which was not generated on the own Computing Element (CE). Moreover the bytes to build the full safety extension are to be taken from different messages.

There is described a software distributed approach (a.k.a. for single point failure avoidance) which implies designing a fault management in two hierarchical layers: one correlated to each voter (i.e. instantiated in each replica entity) belonging to CEs and another within the Hypervisor #4 dedicated to manage the overall computing platform (CP). The latter one, is executed on demand (a.k.a. call to report interface) on the calling core which means which 1 to 3 instances may run at the same time in highest privilege execution mode.

Figure 4:
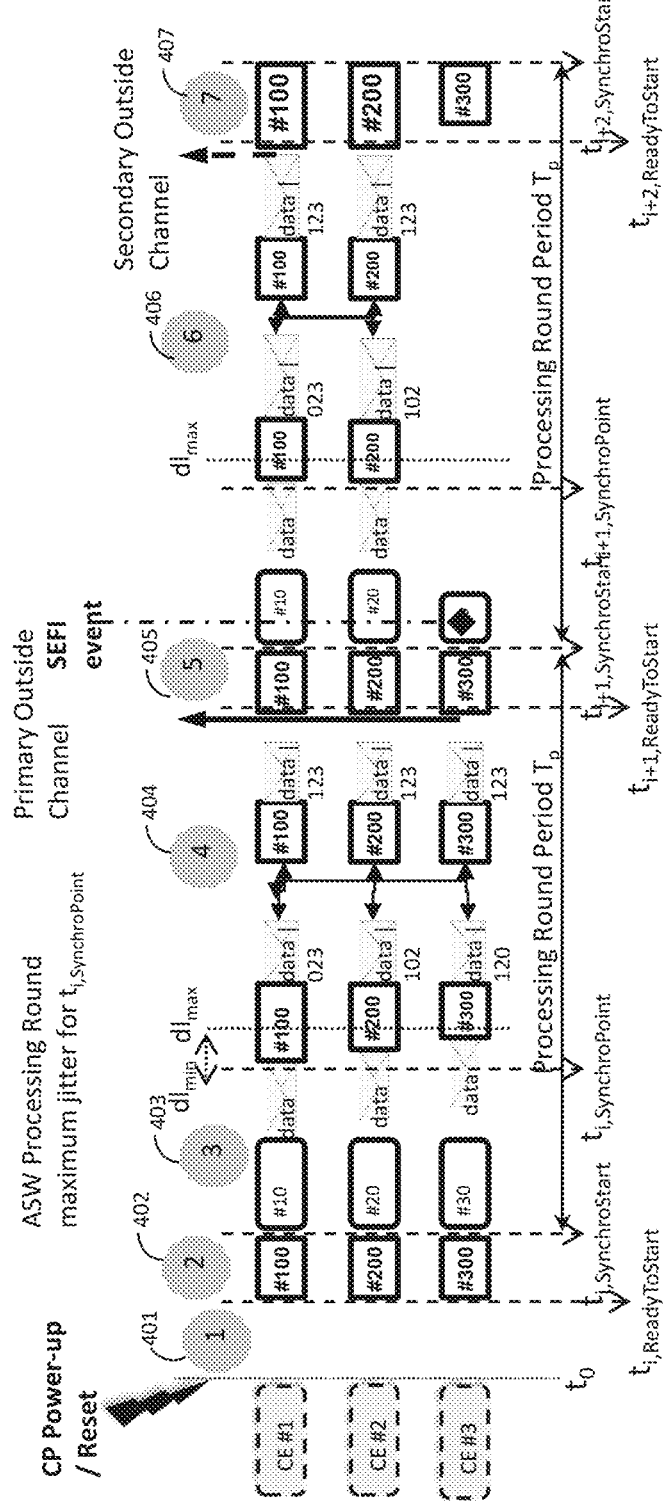
FIG. 4 illustrates the timeline of a Nominal and Faulty dynamic exemplary scenario.

FIG. 4 illustrates the timeline of a Nominal and Faulty dynamic exemplary scenario. It represents an example of a dynamic scenario of a TSwR FT-Fwk in a nominal case (no SEU or SEFI event) and a in faulty case (a SEFI occurs and stops the CE #3 replica execution). The exemplary scenario is sliced in several stages identified with numbered references.

Three CEs are operated (CE#1, CE#2 and CE#3) from separated memory segments on different processing cores. The probability that a SEU or SEFI event locks the processor is thereby reduced. The functional components of the TSwR FT-Fwk architecture instantiated in each Computing Element (CE) detect and mask SEU event impacting a data memory location. It also detects SEFI event on a replica and this faulty replica is isolated and then it will be recovered.

In the example, the CE#3 is faulty. The described methods and systems can reload completely the erroneous CE (e.g. virtual hardware configuration, application software (ASW) and FT-Fwk programs) and then restart the initialization stage during which the input data context is overwritten with correct ones coming from a valid CE (which implies an existing one).

The stage 1 (step 401) corresponds to start-up and initialization of the overall computing platform (CP). The scenario starts from the power-up of computing platform (CP) (time marked t0) with the full initialization of computing platform (CP). The Hypervisor #4 layer loads and starts all Computing Elements (CEs) using only one program stored in a non-volatile memory. According to appropriately predefined virtual machines configuration, the Hypervisor #4 loads three instances of this program in three isolated RAM segments.

The ti,ReadyToStart is a point in time when all replicas (#1, #2 and #3) call to distributed fault management for diagnosis and reactions with respect to their status.

The stage 2 (step 402) corresponds to fault management steps which include the computing platform (CP) state diagnosis and respective reactions. In this example, replicas enter in this stage with a correct behaviour resulting in a nominal reaction; all replicas are voters' membership and no recovery action is performed. The ti,SynchroStart is a point in time when all replicas are blocked waiting for a synchronization signal to start a new processing round. The time duration (ti,SynchroStart–ti,ReadyToStart) is the time slot for distributed fault management and recovery strategy. Such a time slot can be mastered and advantageously limited. During this synchronized blocking point, the global time, the round number and the input data context are updated to each replica.

The stage 3 (step 403) corresponds to the application payload execution time slot. The behaviour correctness of application software (ASW) processing round is monitored with a time window (a.k.a. allowing an execution time jitter) around the predefined ti,SynchroPoint with a minimum dlmin and a maximum dlmax delay to reach this point. The ti,SynchroPoint is a point in time when all application software (ASW) (ASW #10, ASW #20 and ASW #30) have produced output data values and they have called the Application Runtime Interface to build PDU message for communication and synchronization. Since ti,SynchroPoint until ti+1,SynchroStart, the application payload is suspended. The processing round time period [Tp=ti+1,SynchroStart–ti,SynchroStart] can be mastered and advantageously limited. This duration is monitored and the failure to comply with is a non-recoverable error.

The stage 4 (step 404) corresponds to globalization, distributed vote and outside communication time slot. Communication and synchronization layer of each FT-Fwk (#100, 200 and #300) performs safety protocol steps in order to dispatch (in a point-to-point way) own messages to neighbouring replicas. Then, the voting method rolls out with comparison, agreement and commitment activities. This stage ends well and according to the example, the Computing Element CE#3, primary outside channel owner, transmits outside its voted message (including the full safety extension) before the ti+1,ReadyToStart deadline. The ti+1,ReadyToStart is a synchronization point in time when replicas (CE#1, CE#2 and CE#3) call to distributed fault management for diagnosis and reactions with respect to their status.

The stage 5 (step 405) corresponds to fault management activities or steps which include also the computing platform (CP) state diagnosis and respectively reactions. In the example, FT-Fwk #100 and #200 arrive approximately at the same time without any fault detected, the FT-Fwk #300 enters in this stage after and also without any fault detected. Therefore this correct behaviour results in nominal reaction; all replicas stay voters' membership and no recovery strategy is needed.

The stage 6 (step 406) starts with ti+1,SynchroStart synchronization point when all applications payload (ASW#10, ASW#20 and ASW#30) are suspended waiting for a synchronization signal to start a new processing round. The previous stage resumes each replica with new computed global time, next round number and recorded input data context. In the example, there is a particle impact (radiation) on the physical processor and the exemplary scenario assumes that this particle produces a SEFI event on the processing core allocated to Computing Element CE#3. The effect of the impact corresponds to a locking state of the core which could result either to an endless loop situation, a machine check exception or another blocking situation depending on the selected processor architecture. During the application payload execution time slot, the application software (ASW) ASW#30 execution is corrupted and the associated core enters in a locking state which will be detected by one of Health Monitoring mechanisms (e.g. watchdog, exception handler, deadline timeout). In some embodiments, the Health Monitoring component reports a Severe Error status information to the Fault Management component which leads to redundancy management with an action for isolating this replica. In the meantime, application software (ASW) ASW#10 and ASW#20 continue their processing rounds to produce output data values and then they call the Application Runtime Interface entering to ti+1, SynchroPoint synchronization point. In one embodiment, when a climax timeout is triggered (for example due to missing application software (ASW) #30), then both FT-Fwk #100 and #200 report a Warning status information to the Fault Management component which in turn confirms the redundancy management action: Computing Element CE#3 is then isolated from voters. The stage 6 rolls out message globalization, distributed vote and outside communication steps as introduced in stage 4 (step 404). Remaining FT-Fwk #100 and #200 send own messages to each other. Then, the voting method applies only on both remaining members. In the example, the stage ends with Computing Element CE#1; secondary outside channel owner, transmission of its voted message to the outside. The recovery step is now described. At the synchronization point ti+2,ReadyToStart, both remaining replicas (#1 and #2) call to distributed fault management component which passes on to Hypervisor #4 layered fault management.

The stage 7 (step 407) is mainly done by Hypervisor #4 layer which contains the computing platform (CP) fault management and recovery strategy component. The computing platform (CP) fault management diagnoses a Severe Error from CE#3 and then activates the recovery strategy. The recovery can consist, for example, for the Hypervisor #4 to load the program to predefined RAM memory segment and to start over the program from the beginning. This restarted Computing Element CE#3 (re)joins the others replicas at the synchronization point ti+2,SynchroStart.

The invention claimed is:
1. A computer implemented method of detecting a fault in a system comprising the steps of:
   executing at least three virtual machines, each virtual machine executing a same application software, in separated and isolated memory segments and in a dedicated core of a multi-core processor;

said virtual machines being synchronized and concurrently executed by a common hypervisor; wherein non-faulty virtual machines provide an identical output message within a predefined time-interval;

detecting a fault in an output of a virtual machine, said fault corresponding to a different output message of said faulty virtual machine.

2. The method of claim 1 further comprising the step of executing a distributed vote on output messages of the virtual machines to determine a voted output message.

3. The method of claim 2 wherein each virtual machine pulls or pushes an output message to the other virtual machines.

4. The method of claim 3 wherein the output messages of each virtual machine is collected in a deposit box and a voted output message is determined out of the output messages.

5. The method of claim 2 further comprising the step of communicating the voted output message to an external system in communication with the system.

6. The method of claim 5 wherein each virtual machine is predefined as primary or as secondary, and wherein the voted output message is communicated by the primary virtual machine or by the secondary virtual machine if the primary virtual machine is faulty.

7. The method of claim 1 wherein output messages of the virtual machines are numbered and/or time stamped and/or structured and/or annotated.

8. The method of claim 1 further comprising the step of associating a safety extension with an output message of a virtual machine, said safety extension comprising identification information about the virtual machine outputting the output message.

9. The method of claim 1, further comprising the step of recovering the faulty virtual machine.

10. The method of claim 9, wherein the step of recovering the faulty virtual machine comprises using the data context of a non-faulty virtual machine to replace the data context of the faulty virtual machine.

11. The method of claim 9, wherein the step of recovering the faulty virtual machine is performed at a re-synchronization point in time.

12. The method of claim 1 wherein a fault is associated with a failure chosen from the list comprising: crash failure, faulty value failure, *byzantine* failure, timer failure and combinations thereof.

13. A computer program comprising instructions for carrying out the steps of the method according to claim 1, wherein said computer program is executed on a suitable computer device.

14. A non-transitory computer readable medium having encoded thereon a computer program according to claim 13.

15. A system comprising a computer configured to implement a method of detecting a fault in said system comprising the steps of:

executing at least three virtual machines, each virtual machine executing a same application software, in separated and isolated memory segments and in a dedicated core of a multi-core processor;

said virtual machines being synchronized and concurrently executed by a common hypervisor; wherein non-faulty virtual machines provide an identical output message within a predefined time-interval; and detecting a fault in an output of a virtual machine, said fault corresponding to a different output message of said faulty virtual machine.

* * * * *